(12) United States Patent
Albrecht

(10) Patent No.: US 11,324,231 B2
(45) Date of Patent: May 10, 2022

(54) COLD DESSERT WITH GELATIN-BASED COMPONENT ADAPTED FOR LOW-TEMPERATURE CONSUMPTION

(71) Applicant: Wells Enterprises, Inc., Le Mars, IA (US)

(72) Inventor: David Albrecht, Le Mars, IA (US)

(73) Assignee: Wells Enterprises, Inc., Le Mars, IA (US)

( * ) Notice: Subject to any disclaimer, the term of this patent is extended or adjusted under 35 U.S.C. 154(b) by 535 days.

(21) Appl. No.: 16/207,938

(22) Filed: Dec. 3, 2018

(65) Prior Publication Data
US 2019/0166876 A1 Jun. 6, 2019

Related U.S. Application Data

(63) Continuation-in-part of application No. 16/204,544, filed on Nov. 29, 2018.
(Continued)

(51) Int. Cl.
*A23G 9/48* (2006.01)
*A23G 9/32* (2006.01)
(Continued)

(52) U.S. Cl.
CPC .............. *A23G 9/48* (2013.01); *A23G 9/322* (2013.01); *A23G 9/36* (2013.01); *A23G 9/503* (2013.01);
(Continued)

(58) Field of Classification Search
CPC .......... A23G 9/48; A23G 9/322; A23G 9/503; A23G 2200/06; A23G 2200/10; A23G 2220/12; A23G 2220/20; A23V 2250/5432
(Continued)

(56) References Cited

U.S. PATENT DOCUMENTS

| 1,929,732 A | 10/1933 | Zeigler et al. |
| 1,986,049 A | 1/1935 | Fairley et al. |

(Continued)

FOREIGN PATENT DOCUMENTS

| EP | 0560052 A2 | 9/1993 |
| EP | 0619949 A1 | 10/1994 |

(Continued)

OTHER PUBLICATIONS

MadeHow "Popsicle", pp. 1-6, Sep. 3, 2016, http://www.madehow.com/Volume-6/Popsicle.html date obtained from internet archive https://web.archive.org/web/20160903165233/http://www.madehow.com/Volume-6/Popsicle.html (Year: 2016).*

(Continued)

*Primary Examiner* — Jyoti Chawla
(74) *Attorney, Agent, or Firm* — Barnes & Thornburg LLP

(57) ABSTRACT

Cold desserts incorporating gelatin-based (gummy) components are provided in this paper. In particular, stick-mounted cold desserts, edible-cone cold desserts, and container-served desserts with gelatin-based components are described. The gelatin-based components of these desserts are made from gelatin-based candy material that is specially-formulated for consumption at cold temperatures. The gelatin-based components may be used with other components of a cold dessert such as with flavored water ice, ice cream, sherbet, sorbet, and the like as described throughout this paper.

10 Claims, 5 Drawing Sheets

Related U.S. Application Data

(60) Provisional application No. 62/593,558, filed on Dec. 1, 2017.

(51) Int. Cl.
*A23G 9/36* (2006.01)
*A23G 9/50* (2006.01)

(52) U.S. Cl.
CPC .......... *A23G 9/506* (2013.01); *A23G 2200/06* (2013.01); *A23G 2200/10* (2013.01); *A23G 2220/12* (2013.01); *A23G 2220/20* (2013.01); *A23V 2002/00* (2013.01); *A23V 2200/224* (2013.01); *A23V 2250/5432* (2013.01); *A23V 2250/628* (2013.01)

(58) Field of Classification Search
USPC .......................................................... 426/91
See application file for complete search history.

(56) References Cited

U.S. PATENT DOCUMENTS

| | | | |
|---|---|---|---|
| 2,191,352 | A | 2/1940 | Sabin |
| 2,224,167 | A | 12/1940 | Stokes et al. |
| 3,792,182 | A | 2/1974 | Carpigiani |
| 4,219,581 | A | 8/1980 | Dea et al. |
| 4,415,595 | A | 11/1983 | Takemori et al. |
| 5,340,598 | A | 8/1994 | Hay et al. |
| 6,514,555 | B1 | 2/2003 | Fayard et al. |
| 6,558,729 | B1 | 5/2003 | Riviere et al. |
| 6,824,808 | B2 | 11/2004 | Best et al. |
| 6,942,886 | B2 | 9/2005 | Katz |
| 2009/0074932 | A1 | 3/2009 | Swan et al. |
| 2012/0052180 | A1 | 3/2012 | Esteve et al. |
| 2014/0170270 | A1 | 6/2014 | Campanile et al. |
| 2014/0370159 | A1 | 12/2014 | Costello et al. |
| 2015/0216199 | A1 | 8/2015 | Porter et al. |
| 2016/0219901 | A1 | 8/2016 | Rowe |
| 2019/0166875 | A1 | 6/2019 | Albrecht |

FOREIGN PATENT DOCUMENTS

| | | |
|---|---|---|
| JP | 07203861 A | 8/1995 |
| KR | 20130127687 A | 11/2013 |
| WO | 2015126346 A1 | 8/2015 |

OTHER PUBLICATIONS

PrairieMoon "Rocket Freezer Pop Mold—Blue", pp. 1-2 Aug. 2, 2012 http://www.prairiemoon.biz/Rocket-Freezer-Pop-Mold--Blue_p_648.html date obtained from internet archive https://web.archive.org/web/20120802050919/http://www.prairiemoon.biz/Rocket-Freezer-Pop-Mold--Blue_p_648.html (Year: 2012).*

Arbuckle, Ice Cream 2nd Edition The AVI Publishing Group, 1972, p. 35 (Year: 1972).*

International Search Report for PCT International Application Serial No. PCT/US2018/063616, completed Jan. 16, 2019, (10 pages).

International Search Report for PCT International Application Serial No. PCT/US2018/063042, completed Jan. 23, 2019, (10 pages).

Zumbe, et al. "Polyols in confectionery: the route to sugar-free, reduced sugar and reduced calorie confectionery." British Journal of nutrition 85.S1 (Mar. 9, 2001): S31-S45. p. S31 col. 1 para 1, p. S31 col. 1 para 3—col. 2 para 1, p. S33 col. 2 para 2, p. S37 col. 1 para 2, Table 5, and Table 8.

Pete "How to make Gummy Bears—Sweet Pete's All Natural Gummy Bears" https://www.sweetpetecandy.com/blog/news/56228673-how-to-make-gummy-bears-sweet-petes-all-natural-gummy-bears Nov. 11, 2015 p. 1-2 (Year: 2015).

Honeypedia "Honey Ingredients" http://honeypedia.info/honey-ingredients-a-comprehensive-list Oct. 12, 2016 pp. 1-6 (Year: 2016).

Rachael Ray Staff "6 Festive Desserts You Can Make with Halloween Candy" Oct. 11, 2015 https://www.rachaelrayshow.com/recipes/21303_6_festive_desserts_you_can_make_with_halloween_candy pp. 1-4 (Year 2015).

Minifie Chocolate, Cocoa, and Confectionery 3rd Edition Chapman and Hall 1989 p. 334 (Year 1989).

* cited by examiner

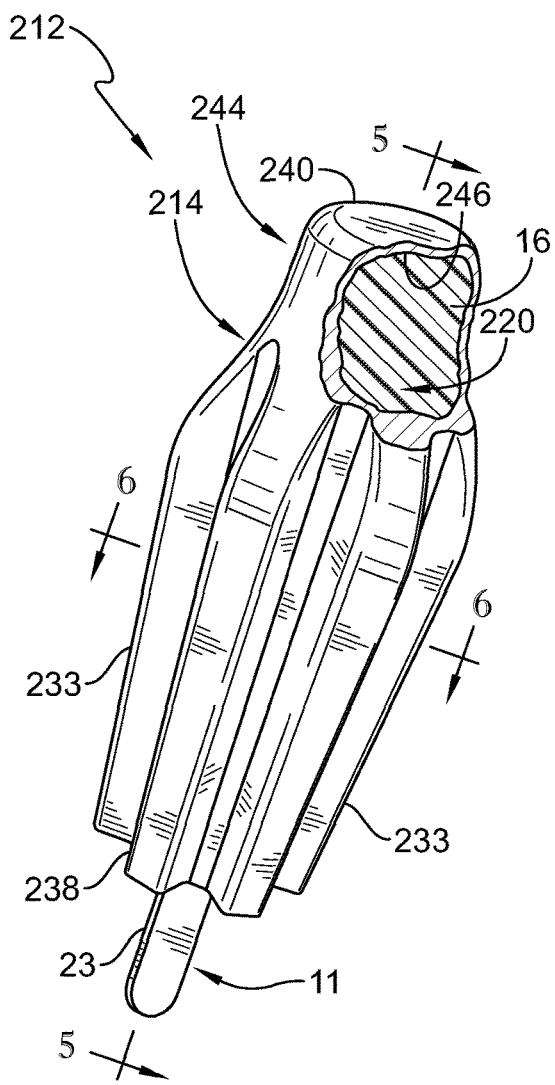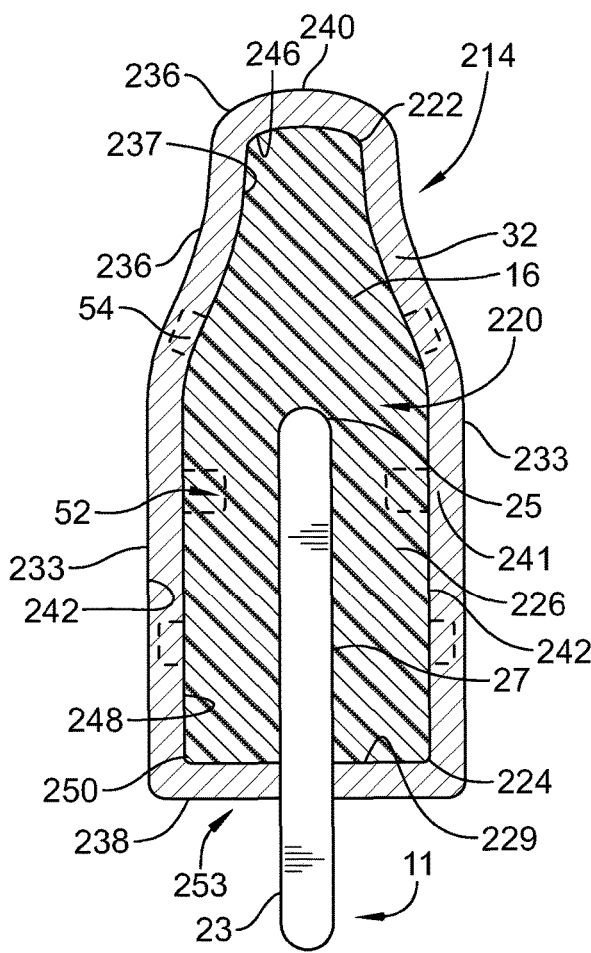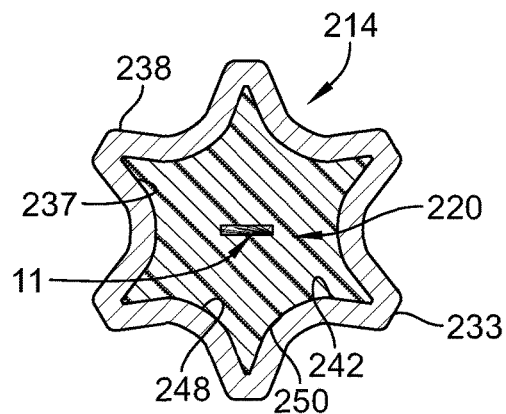

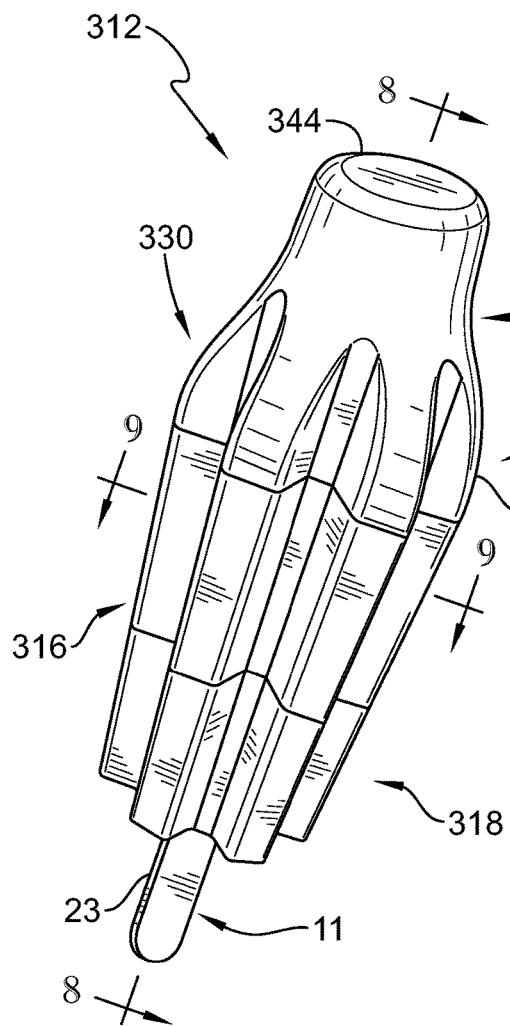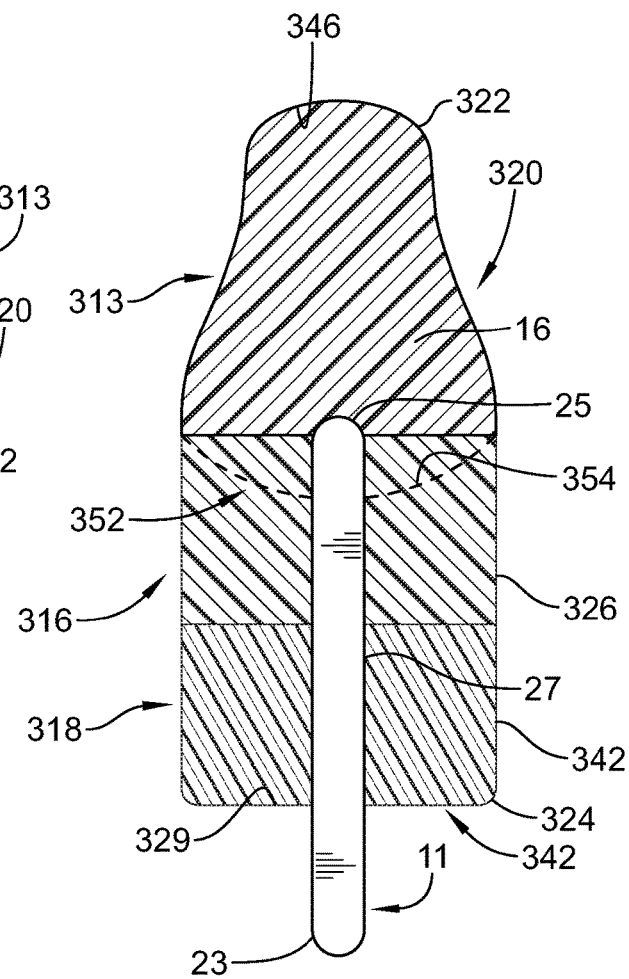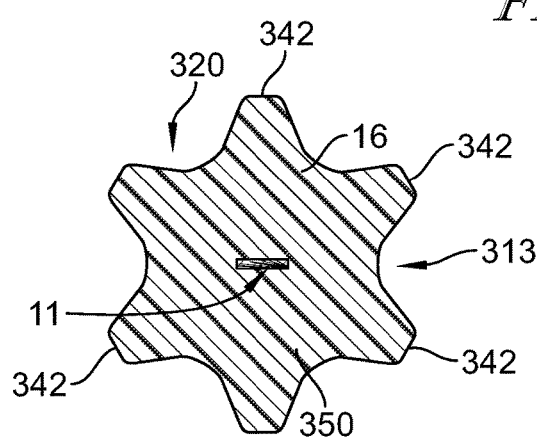

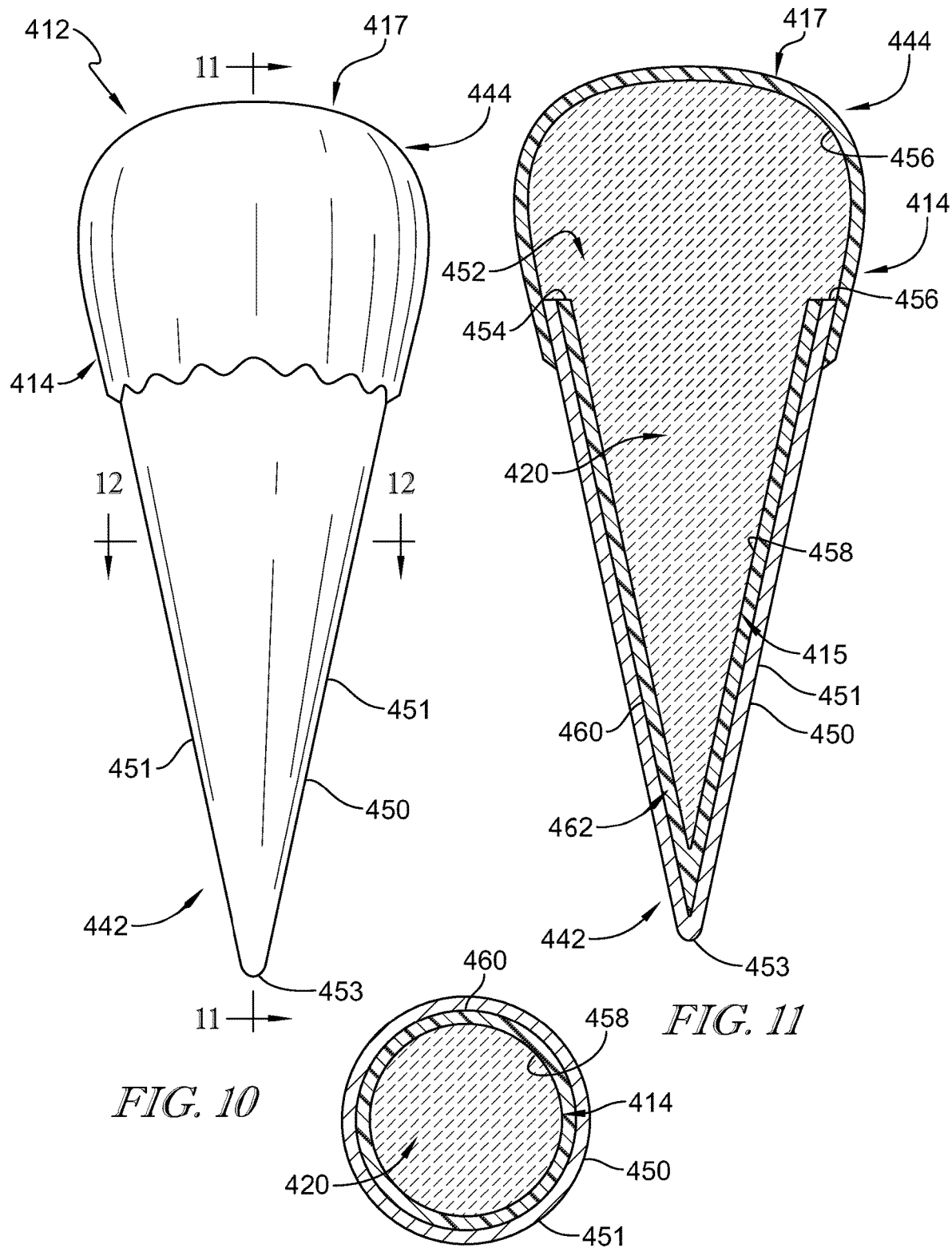

COLD DESSERT WITH GELATIN-BASED COMPONENT ADAPTED FOR LOW-TEMPERATURE CONSUMPTION

PRIORITY CLAIM

This application claims priority under 35 U.S.C. § 119(e) to U.S. Provisional Application Ser. No. 62/593,558, filed Dec. 1, 2017, and to U.S. application Ser. No. 16/204,544, filed Nov. 29, 2018, the entire disclosures of which are expressly incorporated by reference herein.

BACKGROUND

Gelatin-based candy products, such as gummy bears, gummy worms, and the like are sometimes added as toppings to ice cream, frozen yogurt, and other cold desserts. Gelatin-based candies have a desirable mouthfeel at room temperature, which includes a soft and pliable texture and a continuous, controlled release of flavor. However, these candies harden at colder temperatures, such as the temperatures associated with ice cream, frozen yogurt, and the like and can also stick to consumers' teeth. Also, these cold temperatures interfere with the coating's rates of flavor release. As such, there is a need for new gelatin-based candies that retain desirable mouthfeel without excessive stickiness at cold temperatures that can be used in cold desserts.

SUMMARY

According to the present disclosure, cold desserts incorporating gelatin-based (gummy) components are provided. In particular, stick-mounted cold desserts, edible-cone cold desserts, and container-served desserts with gelatin-based components are described.

In illustrative embodiments, the gelatin-based components of these desserts are made from gelatin-based candy material that is specially-formulated for consumption at cold temperatures. The specially-formulated material is designed to be pliable and to maintain a desirable mouth feel at temperatures of 3 degrees C. and below. In specific embodiments described, these gelatin-based components can form outer shells, inner cores, covering layers, or other parts of the various desserts. The gelatin-based components may be used with other components of a dessert such as with flavored water ice, ice cream, sherbet, sorbet, and the like as described throughout this paper.

In illustrative embodiments, the gelatin-based candy may be formulated with invert sugar to provide a soft texture at the temperature of the cold sweetened food. In particular, the gelatin-based candy may comprise about 15 to about 70 wt. % invert sugar. The gelatin-based candy may also comprise about 4 to about 8 wt. % gelatin. The gelatin may have a bloom number of about 150 to about 225. The gelatin-based candy may also comprise about 5 to about 20 wt. % water.

In illustrative embodiments, vitamins and/or minerals may be added to the gelatin-based candy. The addition of vitamins and/or minerals may be desired to promote health benefits of a food product incorporating the gelatin-based candy.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a cold dessert in accordance with the present disclosure with a portion of the cold dessert broken away to show that the cold dessert includes a frozen edible core and a frozen shell of gelatin-based candy material that is specially-formulated for consumption at cold temperatures and further showing a free gripper end of a stick that provides means for holding the cold desert;

Figure 13:
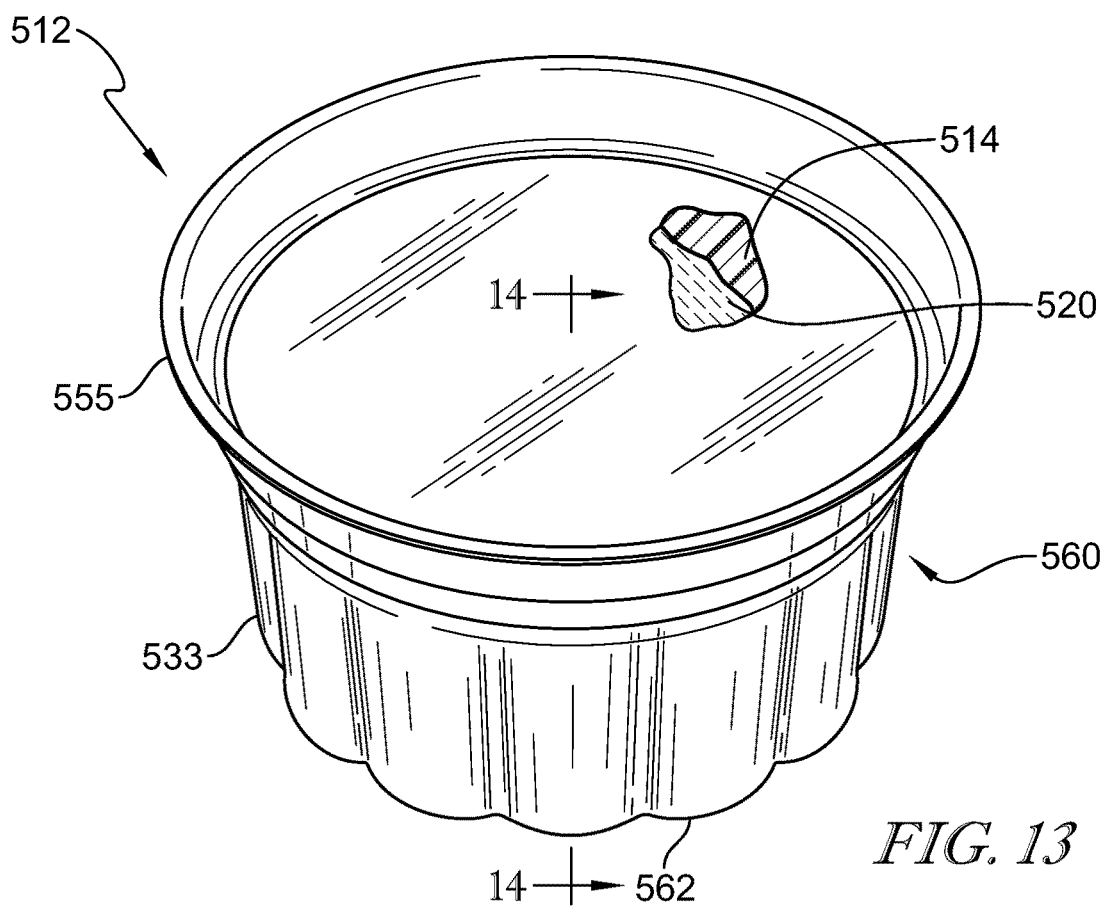
Figure 14:
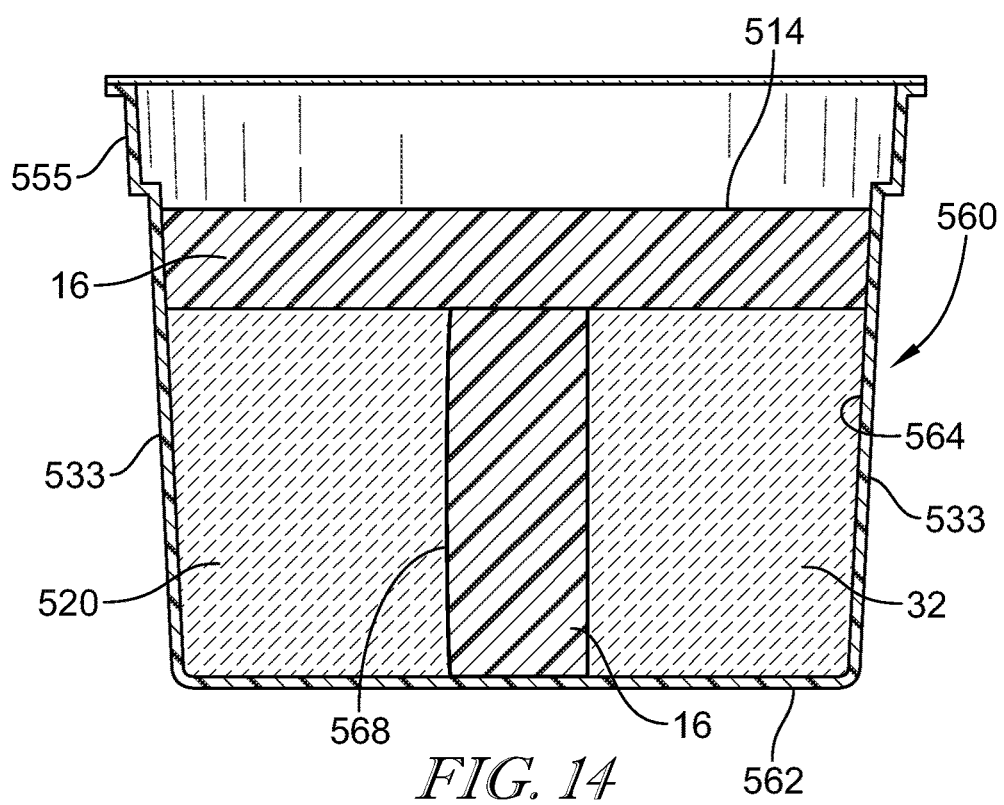

FIG. 4 is a perspective view of a second cold dessert in accordance with the present disclosure with a portion of the cold dessert broken away to show that the cold dessert includes a frozen edible core of gelatin-based candy material that is specially-formulated for consumption at low temperatures and a frozen shell that encapsulates the edible core, and further showing a free gripper end of a stick that provides means for holding the cold desert;

FIG. 5 is a sectional view taken along line 5-5 of FIG. 4 showing the edible core formed from a gelatin-based candy product and the shell formed from flavored water ice encapsulating the edible core, and showing an upper end of the stick arranged inside the edible core to support the edible core and the shell;

FIG. 6 is a sectional view taken along line 6-6 of FIG. 4 showing the relative thickness of the shell as compared to edible core;

FIG. 7 is a perspective view of a third cold dessert in accordance with the present disclosure showing that the cold dessert includes a number of differently flavored/colored segments made up of gelatin-based candy material that is specially-formulated for consumption at low temperatures, and further showing a free gripper end of a stick that provides means for holding the cold desert;

FIG. 8 is a sectional view taken along line 8-8 of FIG. 7 showing the gelatin-based candy product as having three segments, each segment having a different flavor and/or color;

FIG. 9 is a sectional view taken along line 9-9 of FIG. 7 showing the relative segments mounted to the stick;

FIG. 10 is a perspective view of a fourth cold dessert showing that the desert includes a cone with a shell of made up of gelatin-based candy material that is specially-formulated for consumption at low temperatures covering an edible core inside the shell and the cone as further shown in FIGS. 11 and 12;

FIG. 11 is a sectional view taken along line 11-11 of FIG. 10 showing that the shell has an upper shell portion extending over a portion of the edible core that extend out of the cone so as to shield portions of the edible core;

FIG. 12 is a sectional view taken along line 12-12 of FIG. 10 showing that the shell has a lower shell portion extending into the cone and lining an interior of the cone provide protection for the cone from melting of the edible core;

FIG. 13 is a perspective view of a fifth cold dessert showing a container holding an edible core of ice cream and a shell made up of gelatin-based candy material that is specially-formulated for consumption at low temperatures laid over the edible core; and FIG. 14 is a sectional view taken along line 14-14 of FIG. 13 showing the edible core, the shell encompassing an upper surface of the edible core, and the container encompassing a majority of the edible core and shell.

DETAILED DESCRIPTION

For the purposes of promoting an understanding of the principles of the disclosure, reference will now be made to a number of illustrative embodiments and specific language will be used to describe the same.

Figure 1:
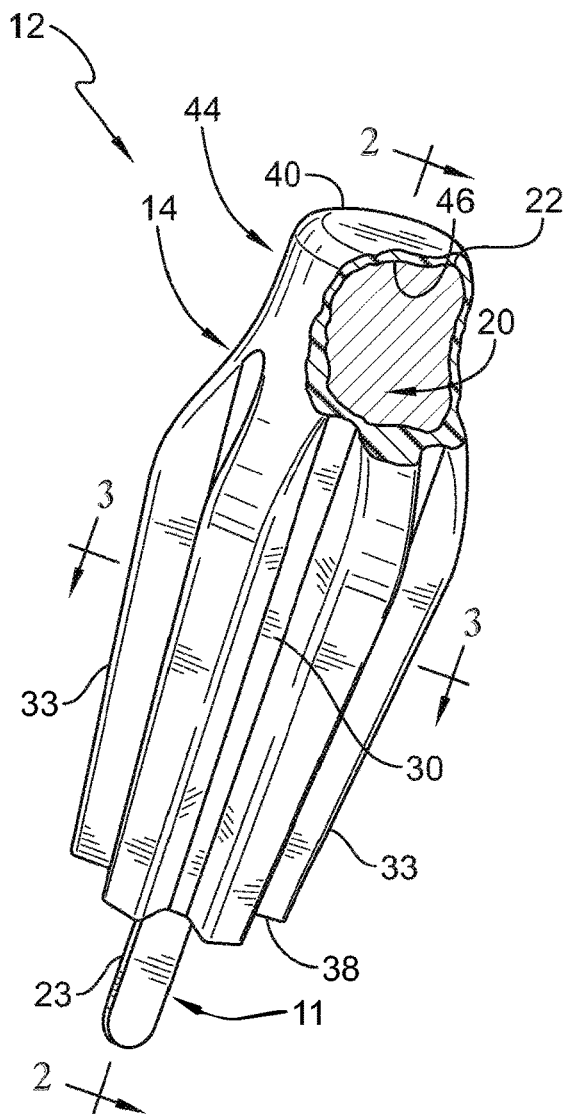
Figure 2:
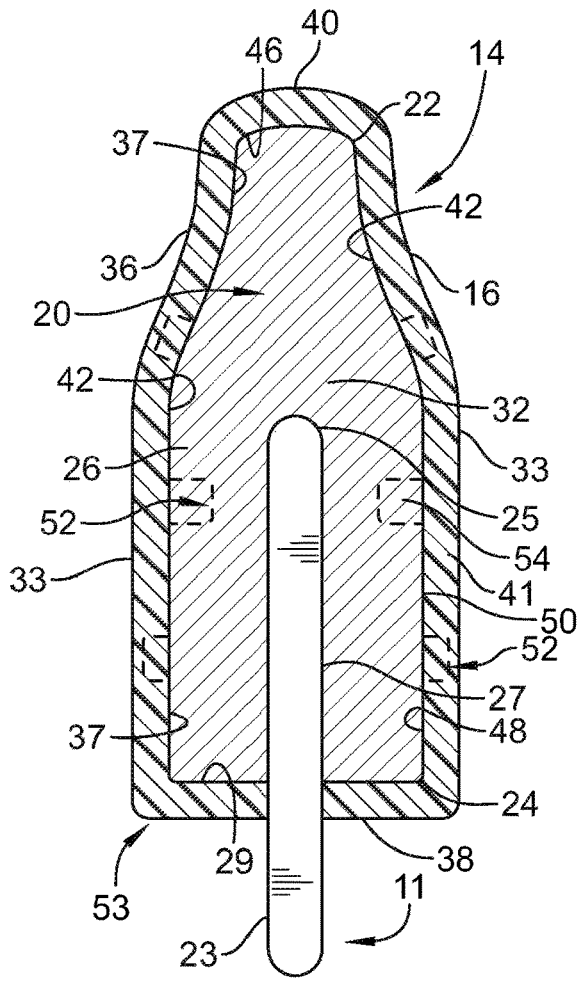
FIG. 2 is a sectional view taken along line 2-2 of FIG. 1 showing the edible core formed from flavored water ice and the shell formed from a gelatin-based candy product encapsulating the edible core, and showing an upper end of the stick arranged inside the edible core to support the edible core and the shell.
Figure 3:
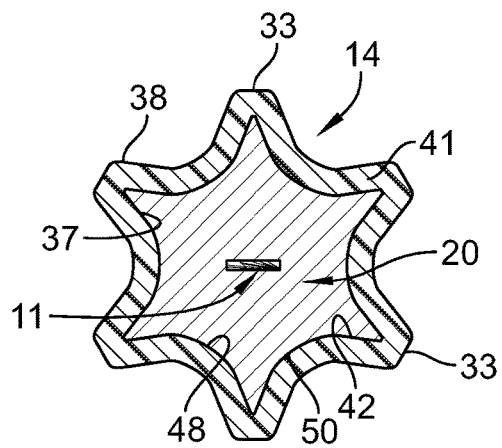
FIG. 3 is a sectional view taken along line 3-3 of FIG. 1 showing the relative thickness of the shell core as compared to the edible core.

A cold dessert 12 served on a stick 11 is formed to include edible core 20 of flavored water ice and a shell 14 made from a gelatin-based candy product 16 as shown in FIGS. 1-3. The gelatin-based candy material 16 of the shell 14 is specially-formulated for consumption at low temperatures. More specifically, the gelatin-based candy material 16 of the shell 14 is specially formulated to comprise invert sugar and other components designed to be served at 3 degrees C. or colder while maintaining a desirable mouth feel of the gelatin-based candy product 16.

The cold dessert 12 shown in FIGS. 1-3 includes the stick 11, the edible core 20, and the shell 14. Stick 11 extends out from the core 20 and shell 14 to provide means for holding the dessert 12. Edible core 20 is illustratively made from flavored water ice and has an elongated, cylindrical-type shape. In some embodiments, edible core 20 may be made from ice cream, soft-serve ice cream, gelato, frozen custard, soy milk ice cream, nut milk ice cream, coconut milk ice cream, avocado-based ice cream, frozen yogurt, frozen Greek yogurt, frozen kefir, a parfait, sorbet, sherbet, cheesecake, cake, pie, a milkshake, a malt, a smoothie, frozen fruit, Italian ice, a snow cone, whipped cream, or other suitable cold edible products. Shell 14 encapsulates edible core 20 but in other embodiments may only extend over parts of the core 20. In illustrative embodiments, cold desserts 12 may be stored and dispensed/served at a temperature between about −75° C. and about 0° C.

Gelatin-based candy 16 may be formulated with invert sugar to provide a soft texture at the temperature of the cold dessert 12. Gelatin-based candy 16 is formed by methods for forming gelatin-based candies as discussed below as well as in the herein incorporated, related U.S. Provisional Application Ser. No. 62/593,558 (hereinafter the '558 Prov. App.). In some embodiments, Gelatin-based candy 16 is formed from an initial mixture comprising a gelling component, invert sugar, and water. It is contemplated that various gelling components may be used for forming gelatin-based candy 16. In some embodiments, the mixture further comprises one or more additional sweeteners including sugars and sugar substitutes. Also, the mixture preferably comprises one or more natural or artificial flavor agents.

In some embodiments, gelatin-based candy products 16 are formed from an initial mixture comprising a gelling component, invert sugar, and water. In some embodiments, the mixture further comprises one or more additional sweeteners including sugars and sugar substitutes. Also, the mixture preferably comprises one or more natural or artificial flavor agents.

Gelatin-based candy 16 may be formulated with invert sugar to provide a soft texture at the temperature of the cold dessert 12. In illustrative embodiments, gelatin-based candy 16 may comprise about 15 to about 70 wt. % invert sugar. Gelatin-based candy 16 may also comprise about 4 to about 8 wt. % gelatin. The gelatin may have a bloom number of about 150 to about 225. Gelatin-based candy 16 may also comprise about 5 to about 20 wt. % water.

Gelatin-based candy products 16 may further comprise one or more additional sugars including but not limited to sucrose, fructose, glucose, honey, high fructose corn syrup, maple syrup, molasses, and combinations of the foregoing. The one or more additional sugars may be added to the initial formulation as a dry sugar, as a syrup, or as an aqueous solution.

Gelatin-based coating 16 may further comprise one or more sugars substitutes including but not limited to saccharin, aspartame, acesulfame potassium, sucralose, *stevia*, sorbitol, xylitol, mannitol, maltitol, erythritol, isomalt, lactitol, glycerol, and combinations of the foregoing.

In some embodiments, the initial mixture comprising the gelling component, invert sugar, and any additional components such as additional sweeteners and flavor agents are dissolved in water at an elevated temperature. The mixture is cooled and allowed to gel, forming gelatin-based candy product 16. As a result of the formation process, gelatin-based candy product 16 has a decreased water content compared to the initial mixture.

It is contemplated that various gelling components that may be used for forming gummy candy products in accordance with the present disclosure. Suitable gelling components include but are not limited to gelatin, collagen, pectin, vegetable proteins (i.e. pea protein), carnauba wax, carrageenan, agar, vegetable gums, guar gum, xantham gum, gum arabic, locust bean gum, tapioca starch, and combinations of the foregoing. In view of this, non-gelatin-based candies are envisioned in which non-gelatin based gummy candies may be manufactured with other gelling components while still taking advantage of the teaching of the present disclosure.

In some embodiments the gelling component is bovine gelatin, porcine gelatin, or piscine gelatin.

In some embodiments, candy products 16 comprise less than about 1 wt. % high fructose corn syrup. In some embodiments, candy products 16 comprise less than about 1 wt. % cornstarch. In some embodiments, candy products 16 comprise gelatin and comprise less than about 1 wt. % or less than about 0.1 wt. % of any other gelling component.

Gelatin-based candy 16 may further comprise one or more natural and/or artificial flavor agents including but not limited to strawberry, cherry, lime, lemon, apple, orange, and combinations of the foregoing. Gelatin-based candy products 16 may further comprise one or more acids that impart a sour flavor, including but not limited to citric acid, ascorbic acid, tartaric acid, acetic acid, fumaric acid, lactic acid, and combinations of the foregoing. The natural and/or artificial flavor agents and the acid comprise less than about 2 wt. % or about less than 1 wt. % of gelatin-based candy product 16.

In some embodiments, gelatin-based candy 16 further comprise a small quantity of oil and/or wax such as vegetable oil, coconut oil, and/or carnauba wax. The oil and/or wax comprise less than about 0.5 wt. %, less than about 0.25 wt. %, or less than 0.2 wt. % of gelatin-based candy 16. Additionally, gelatin-based candy 16 may further comprise one or more food colorings.

In illustrative embodiments, vitamins and/or minerals may be added to gelatin-based candy 16. The addition of vitamins and/or minerals may be desired to promote health benefits of a food product incorporating gelatin-based candy 16.

An example of a suitable formulation and resulting gelatin-based candy 16 is provided below:

Example 1: Formula

TABLE 1

Ingredient concentrations in initial formulation and finished gelatin-based candy product formed from the initial formulation.

| Ingredient | Initial Formulation (wt. %) | Gelatin-based Candy Product (wt. %) |
|---|---|---|
| Water | 24.90% | 19.00% |
| Invert Sugar | 34.72% | 37.45% |
| Sucrose | 34.69% | 37.41% |
| Gelita Gelatin (175 Bloom) | 5.70% | 6.14% |

Gelatin-based candy 16 formed according to Table 1 show improved softness, pliability, and flavor release at cold temperatures compared to conventional gelatin-based candies.

As shell 14 is configured to provide a soft texture at the temperature of cold dessert 12 and/or to carry additional nutrients/flavors therein, shell 14 may be used with a multitude of cold desserts 12 including but not limited to cold dairy-based desserts, cold diary-substitute-based desserts, ice cream, soft-serve ice cream, gelato, frozen custard, soy milk ice cream, nut milk ice cream, coconut milk ice cream, avocado-based ice cream, frozen yogurt, frozen Greek yogurt, frozen kefir, a parfait, sorbet, sherbet, a frozen fruit, a frozen fudge, cheesecake, cake, pie, a milkshake, a malt, a smoothie, frozen fruit, Italian ice, a snow cone, whipped cream, and combinations of the foregoing. As used herein, "cold" refers to temperatures between about −75° C. and about 10° C.

Stick 11 is formed to include a gripper end 23, a top end 25 spaced apart from gripper end 23, and a body 27 extending therebetween. Stick 11 is illustratively formed from wood, but other materials known in the art, such as plastics, are contemplated herein. Additionally, stick 11 may be formed from a variety of edible substances. Top end 25 of stick 11 is positioned such that each surface of top end 25 engages core 20.

Shell 14 is configured to encompass core 20 and is formed to include a plurality of side walls 33, a lower edge 38, and an upper edge 40 as illustratively shown in FIGS. 1-3. Side walls 33 are spaced apart from each other with lower edge 38 extending therebetween at a bottom 53 of cold dessert 12 and upper edge 40 extending therebetween at a top 44 of cold dessert 12. Surfaces 33 and edges 38, 40 are formed to include an inner surface 37 and an outer surface 36, as illustratively shown in FIGS. 1-6. Inner surface 37 is spaced apart from outer surface 36 with a shell body 41 extending therebetween and configured to engage core 20. Outer surface 36 extends outwardly away from inner surface 37 and is configured to retain the desired shape of shell 14. Illustratively, pair of side walls 33, lower edge 38, and upper edge 40 are formed from the same material. In some embodiments, the various surfaces 33 and edges 38, 40 of shell 14 are formed from varied material such that not all of surfaces 33 and edges 38, 40 are formed from a common material. As discussed further herein and shown in FIGS. 1-3, shell 14 is formed from gelatin-based candy product 16. In some embodiments, shell 214 may be formed from a plethora of cold desserts 12 including, but not limited to flavored water ice, ice cream, sorbet, and/or other cold desserts 12 known in the art, as shown in FIGS. 4-6.

Edible core 20 is located within shell 14 and includes a plurality of side surfaces 42, a lower edge 29, and an upper edge 46, as illustratively shown in FIGS. 1-6. Side surfaces 42 are spaced apart from each other with lower edge 29 extending therebetween at bottom 53 of cold dessert 12 and upper edge 46 extending therebetween at top 44 of cold dessert 12.

Surfaces 42 and edges 29, 46 are formed to include an inner surface 48 and an outer surface 50, as illustratively shown in FIGS. 1-6. Inner surface 48 is configured to engage core 20. Outer surface 50 extends outwardly away from inner surface 48 and is configured to engage inner surface 37 of shell 14. Illustratively, plurality of side walls 33, lower edge 29, and upper edge 46 are formed from the same material. In some embodiments, the various surfaces 42 and edges 29, 46 of shell 14 are formed from varied material such that not all of surfaces 42 and edges 29, 46 are formed from a common material. As discussed further herein and shown in FIGS. 1-3, edible core 20 is illustratively formed from a plethora of cold desserts 12 including, but not limited to flavored water ice, ice cream, sorbet, and/or other cold desserts 12 known in the art.

A second cold desert 212 is shown in FIGS. 4-6 in which an edible core 220 is formed from gelatin-based candy material that is specially-formulated for consumption at cold temperatures while a shell 214 is formed from flavored water ice. Cold dessert 212 is substantially similar to cold dessert 12 shown in FIGS. 1-3 and described above. Accordingly, the description of cold dessert 12 is hereby incorporated by reference to apply to cold dessert 212 except as it departs from the further description and drawings of cold dessert 212.

However, unlike the cold dessert 12, cold dessert 212 is inverted such that the gelatin-based candy material forms the edible core 220 of the product. In such embodiments, other materials are also contemplated for providing the shell 214, such as chocolate, sugar-based candy enamel, and other suitable foods.

A third cold dessert 312 is formed entirely from an edible core 320 formed from gelatin-based candy material that is specially-formulated for consumption at cold temperatures as shown in FIGS. 7-9. The cold dessert 312 includes a plurality of edible segments 330 made from gelatin-based candy product 16. Each of the plurality of segments 330 may be formed to have a different color and/or flavor than the other segments 330. In some alternative embodiments, segments 330 may be formed from distinct materials such that at least one of the segments 330 is formed from gelatin-based candy product 16 and at least one of the segments 330 is formed from flavored water ice, ice cream, or other cold desserts 312 known in the art.

As shown in FIGS. 7-9, edible core 320 illustratively includes an upper segment 313, a lower segment 318 spaced apart from upper segment 313, and a mid-segment 316 extending therebetween. Illustratively, each segment 313, 316, 318 has a distinct flavor and/or color such that the segments 330 are formed independent of each other. Illustratively, stick 11 extends through segments 330 and is coupled to each of the segments 330. In some embodiments, stick 11 may only be coupled to one of the segments 330.

In some embodiments, cold dessert 312 is formed to include a retention mechanism 352, as shown in FIG. 8. Retention mechanism 352 is provided by a dome-shaped interface between segments 330 to increase the surface area of the interface that discourages disengagement between segments 330. Other shapes such as conical-shaped interfaces and protrusions for increasing surface area and discouraging disengagement are also contemplated.

In a fourth cold dessert 412 shown in FIGS. 10-12, the dessert 412 includes a cone 450, an edible core 420, and a shell 414 of gelatin-based material. Specifically, the shell 414 is formed from gelatin-based candy material that is specially-formulated for consumption at cold temperatures as described above. The edible core 420 is illustratively ice cream but could also be provided by sherbert, sorbet, or other frozen foods as recognized throughout this paper. The cone 450 is illustratively made from waffle-type material but could be any other type of edible or even non-edible cone.

The shell 414 includes a lower shell 415 and an upper shell 417 as shown in FIGS. 9-12. Lower shell 415 lines a side wall 451 of cone 450 to block material forming edible core 420 from reaching cone 450 such that cone 450 remains dry and/or maintains its structural integrity. Upper shell portion 417 extends over a portion of the edible core 420 outside of the cone 450 so as to shield portions of the edible core 420.

Lower shell 415 is positioned within cone 450 such that inner surface 458 engages edible core 420 and outer surface 460 engages cone 450. Lower shell 415 is formed from an inner surface 458 spaced apart from an outer surface 460 with a lower shell body 462 extending therebetween. Cone 450 houses lower shell 415 and cooperates with lower shell 415 to form a top edge 452 having a first end 454 spaced apart from a second end 456. Cone 450 is positioned such that bottom point 453 is positioned below upper shell 417.

A fifth cold dessert 512 served in a container 560, as shown in FIGS. 13-14. In this dessert, an edible core 520 made from ice cream is covered by a shell or layer 514 of gelatin-based material. Specifically, the shell 514 is made from gelatin-based candy material that is specially-formulated for consumption at cold temperatures as described above. Thus, when a user dips a spoon into the dessert 512, a bite containing both edible parts is created. While the edible core 520 is described as ice cream, it may also be made from sorbet, sherbert, or any other suitable cold food.

Container 560 is configured to retain cold dessert 512 therein and is formed to have a side wall 533, a base 562 extending under an interior defined by side wall 533, and an upper ledge 555. Side walls 533 and base 562 are formed to have an inner surface 564 configured to engage cold dessert 512. Illustratively, inner surface 564 of base 562 engages edible core 520 while inner surface 564 of side walls 533 engages edible core 520 and shell 514.

In some embodiments, shell 514 may be formed to include a protrusion 568 coupled to and extending away from shell 514 towards base 562. Protrusion 568 may further be engaged with base 562 such that it is removeably coupled thereto. Illustratively, protrusion 568 is formed from gelatin-based candy products 16.

In illustrative embodiments, vitamins and/or minerals may be added to gelatin-based candy used as components of the desserts 12, 212, 312, 412, 512 described herein. The addition of vitamins, minerals, protein, carbs, fats, and/or any other desired nutrient/nutrient combination may be desired to promote health benefits of a food product incorporating gelatin-based candy. As such, cold desserts may convey health benefits of the incorporated nutrients unto the consumer while retaining the taste and texture desired by consumers.

The invention claimed is:

1. A cold dessert comprising
   a stick,
   a frozen edible core coupled to the stick and having an outer surface, and
   a shell made from a gelatin-based candy product that interfaces with the outer surface of the frozen edible core and that comprises about 25 to about 85 wt. % invert sugar, about 4 to about 8 wt. % of a gelling component, wherein the gelling component is gelatin and wherein the gelatin has a bloom number of about 150 to about 225, and about 5 to about 20 wt. % water such that the shell is adapted to remain pliable at a temperature below 5° C. for ease of consumption and soft mouth feel for a consumer.

2. The cold dessert of claim 1, wherein the gelatin-based candy further comprises about 30 to about 50 wt. % sucrose.

3. The cold dessert of claim 1, wherein the gelatin-based candy comprises less than about 1 wt. % high fructose corn syrup.

4. The cold dessert of claim 1, wherein the gelatin-based candy further comprises less than about 0.1 wt. % of any gelling component other than the gelatin.

5. The cold dessert of claim 1, wherein the edible core is selected from the group consisting of flavored frozen ice, ice cream, soft-serve ice cream, gelato, frozen custard, soy milk ice cream, nut milk ice cream, coconut milk ice cream, avocado-based ice cream, frozen yogurt, frozen Greek yogurt, frozen kefir, sorbet, sherbet, Italian ice, a snow cone, and combinations of the foregoing.

6. The cold dessert of claim 1, wherein the shell encapsulates the edible core.

7. The cold dessert of claim 1, wherein the gelatin-based candy is made to exhibit a variegate.

8. The cold dessert of claim 7, wherein the shell is shaped to encompass an entirety of the frozen edible core.

9. The cold dessert of claim 2, wherein the shell is formed to have a higher solidity relative to the frozen edible core.

10. The cold dessert of claim 1, wherein the gelatin-based candy product comprises about 50 to about 85 wt. % invert sugar.

* * * * *